United States Patent [19]
Slater

[11] Patent Number: 5,828,139
[45] Date of Patent: Oct. 27, 1998

[54] ELECTRICAL CIRCUIT FOR AN AUTOMOBILE

[76] Inventor: Benjamin Daniel Slater, 2211 E. Mohawk Rd., N. St. Paul, Minn. 55109

[21] Appl. No.: 917,970

[22] Filed: Aug. 27, 1997

[51] Int. Cl.$^6$ ..................................................... B60Q 1/04
[52] U.S. Cl. ............................ 307/10.8; 315/82; 315/77; 340/457.2
[58] Field of Search .................................. 307/9.1, 10.1, 307/10.6, 10.7, 10.8, 38, 39; 315/76, 77, 80, 82, 83; 701/1, 36, 49; 340/457, 457.2, 458, 465, 468, 464, 475, 476, 479

[56] References Cited

U.S. PATENT DOCUMENTS

| | | | |
|---|---|---|---|
| 4,896,137 | 1/1990 | Lee, III et al. | 307/10.8 |
| 5,001,398 | 3/1991 | Dunn | 315/77 |
| 5,075,593 | 12/1991 | Shoda | 315/83 |
| 5,220,245 | 6/1993 | Honda et al. | 318/82 |
| 5,483,107 | 1/1996 | Xander | 307/10.8 |
| 5,498,910 | 3/1996 | Hopkins et al. | 307/10.1 |
| 5,499,009 | 3/1996 | Davis | 307/10.8 |
| 5,515,028 | 5/1996 | Dittmar | 307/10.8 |
| 5,610,578 | 3/1997 | Gilmore | 307/10.8 |
| 5,638,045 | 6/1997 | Byrd | 307/10.8 |
| 5,677,671 | 10/1997 | Pabla et al. | 307/10.8 |

*Primary Examiner*—Richard T. Elms
*Assistant Examiner*—Peter Ganjian
*Attorney, Agent, or Firm*—Thomas B. Tate

[57] ABSTRACT

An electrical circuit for an automobile. The circuit includes a battery, turn signal switch, brake switch, parking light switch, flashers, diodes, a relay, turn lights, parking lights, tail lights, and brake lights. When the turn signal is activated, the parking lights and tail lights come on. When the brakes are applied, the tail lights come on in the daytime and go off at night.

2 Claims, 1 Drawing Sheet

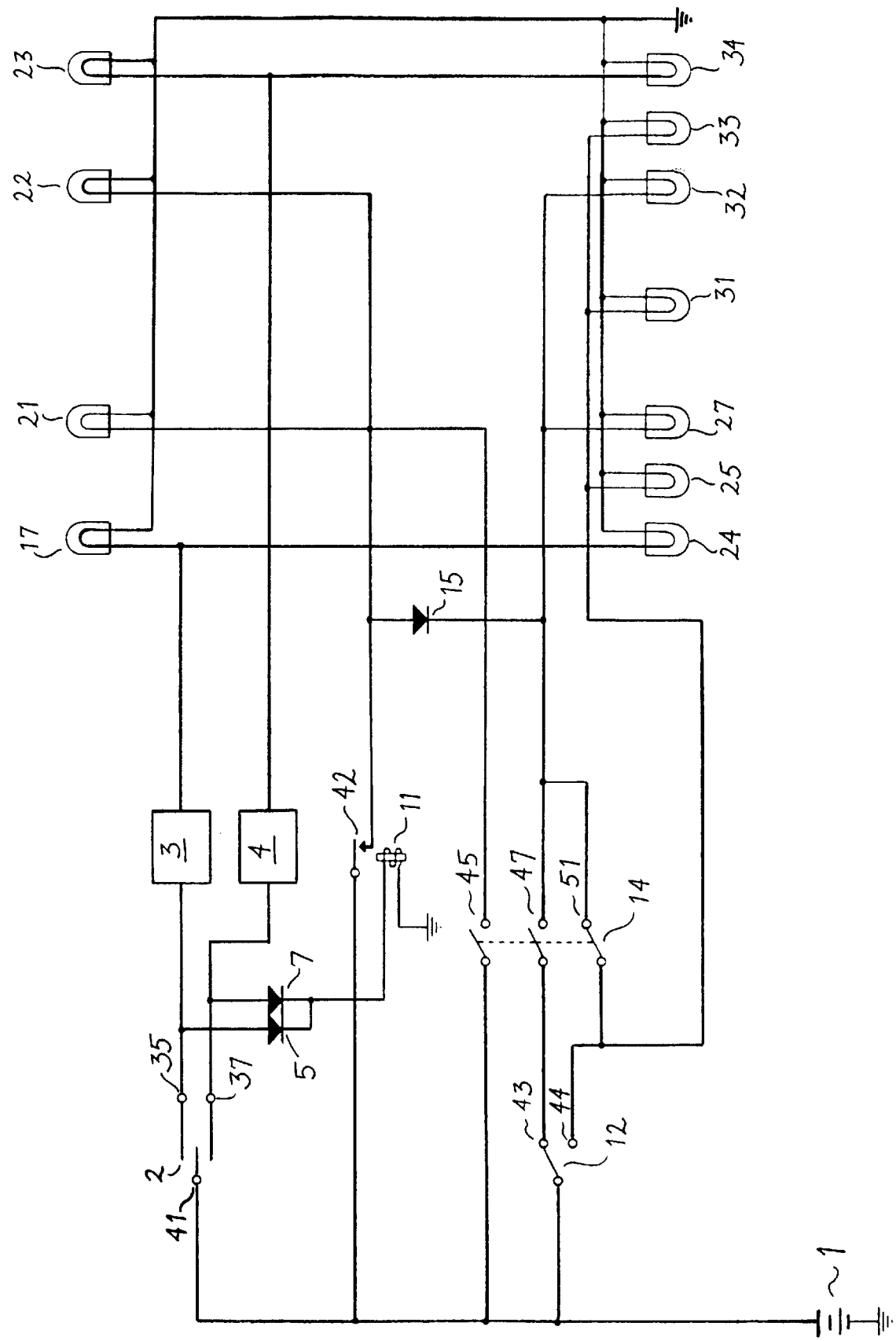

ELECTRICAL CIRCUIT FOR AN AUTOMOBILE

BACKGROUND OF THE INVENTION

1. Field of the Invention

The invention pertains to electrical circuits for automobile lights.

2. Description of the Related Art.

No known prior art discloses the features claimed in the present invention.

BRIEF SUMMARY OF THE INVENTION

When the turn signal is activated, the parking and tail lights come on during the daytime (at night, the parking and tail lights are already on). When the brakes are applied, the tail lights come on in the daytime and go off at night.

Advantages of the invention are as follows: when the brakes are applied in the daytime, the tail lights come on in addition to the brake lights to give more illumination than the brake lights alone would provide. When the brakes are applied at night, the tail lights go off. Thus the brake lights, which are brighter than the tail lights, draw the attention of the driver of a following car becaues the brake lights appear more brilliant than the tail lights that were previously on. A relay turns on both the parking lights (in front) and tail lights (in rear) on when the turn signal is on, thus providing more light than the turn lights alone would provide.

BRIEF DESCRIPTION OF THE FIGURE

The figure is a schematic diagram of the circuit.

DETAILED DESCRIPTION OF THE INVENTION

The invention is an electrical circuit for automobile lights. The circuit includes a battery 1, turn signal switch 2, flashers 3 and 4, diodes 5, 7, and 15, relay 11, brake switch 12, parking light switch 14, and front and rear lights. Turn signal switch 2 is a single-pole double-throw switch having left 35 and right 37 signal positions and a center off position 41. Relay 11 is a single-pole single-throw relay having a normally open contact 42 (that is, open when no current is flowing therethrough). Brake switch 12 is a single-pole double-throw switch having off 43 and on 44 positions. Parking light switch 14 is a triple-pole single-throw switch having a first normally open contact 45, a second normally open contact 47, and a normally closed contact 51 (that is, closed when no current is flowing there-through). The front lights include left turn light 17, left parking light 21, right parking light 22, and right turn light 23. The rear lights include left turn light 24, left brake light 25, left tail light 27, middle brake light 31, right tail light 32, right brake light 33, and right turn light 34.

The wiring connections between the various elements are as shown in the figure, namely:

Battery 1 is connected to turn signal switch 2. Turn signal switch 2 (left position 35) is connected through flasher 3 to left turn light 17 and to left rear turn light 24. Turn signal switch 2 (right position 37) is connected through flasher 4 to right front turn light 23 and to right rear light 34.

Battery 1 is connected to relay 11, which is connected to parking lights 21 and 22. Turn signal switch 2 is connected to diodes 5 and 7 (left position 35 to first diode 5, right position 37 to second diode 7), which are connected to relay 11. Relay 11 is connected to third diode 15, which is connected to left tail light 27 and to right tail light 32.

Battery 1 is connected to parking light switch 14. Parking light switch 14 (normally open contact 45) is connected to parking lights 21 and 22. Battery 1 is connected to brake switch 12. Brake switch 12 (on opposite 44) is connected to left brake light 25, to middle brake light 31, and to right brake light 33. Brake switch 12 is connected to parking light switch 14 (off position 43 to normally open contact 47, on position 44 to normally closed contact 51). Parking light switch 14 (normally open contact 47 and normally closed contact 51) is connected to left tail light 27 and to right tail light 32.

The circuit operates as follows:

When the turn signal switch 2 is activated to the left position 35, current from the battery 1 flows through flasher 3 to left front turn light 17 and left rear turn light 24, causing these lights to flash. When the turn signal switch 2 is activated to the right position 37, current from the battery 1 flows through flasher 4 to right front turn light 23 and right rear turn light 34, causing these lights to flash.

When the turn signal switch 2 is activated (that is, moved to either the left position 35 or the right position 37) during the daytime, current flows from the battery 1 to the normally open contact 42 of relay 11 which closes, thus allowing current to flow to the parking lights 21 and 22 to turn them on, and also allowing current to flow through diode 15 to the tail lights 27 and 32 to turn them on. At night, the parking light switch 14 is activated (that is, the normally open contacts 45 and 47 close and the normally closed contact 51 remains closed), allowing current to flow to the parking lights 21 and 22 and tail lights 27 and 32. When the turn signal switch 2 is activated at night, the normally open contact 42 of relay 11 closes in the same manner as during the daytime. However, there is no effect on the parking lights 21 and 22 and tail lights 27 and 32 because these lights are already on.

When the brake light switch 12 is activated (that is, moved from off position 43 to on position 44) in the daytime (parking light switch 14 is off), normally open contact 47 of parking light switch 14 closes, thus supplying current from the battery 1 to the tail lights 27 and 32 to turn the tail lights 27 and 32 on. When the brake switch 12 is activated at night parking light switch 14 is on), normally closed contact 51 of parking light switch 14 opens, thus interrupting the flow of current from the battery 1 to tail lights 27 and 32 to turn tail lights 27 and 32 off. By day or night, when the brake light switch 12 is activated to the on 44 position, current flows from the battery 1 to the brake lights 25, 31, and 33 to turn them on.

I claim:

1. An electrical circuit for an automobile, said circuit comprising:

a battery;

a single-pole double-throw turn signal switch having a left turn position, a right turn position, and a center off position;

a first flasher and a second flasher;

a first diode and a second diode;

a single-pole single-throw relay having a normally open contact;

a third diode;

a single-pole double-throw brake switch having an off position and an on position;

a triple-pole single-throw parking light switch having a first normally open contact, a second normally open contact, and a normally closed contact;

front lights including a left turn light, a left parking light, a right parking light, and a right turn light;

rear lights including a left turn light, a left brake light, a left tail light, a middle brake light, a right tail light, a right brake light, and a right turn light;

and wiring connections between said components as follows:

said battery is connected through said turn signal switch and said flashers said front and rear turn lights;

said battery is connected through said relay to said parking lights;

said battery is connected through said turn signal switch, said first and second diodes, said relay, and said third diode to said tail lights;

said battery is connected through said parking light switch to said parking lights;

said battery is connected through said brake switch to said brake lights;

said battery is connected through said brake switch and said parking light switch to said tail lights.

2. The circuit of claim 1, wherein said circuit operates as follows:

When said turn signal switch is activated during the daytime, current flows from said battery to said normally open contact of said relay, allowing current to flow to said parking lights to turn said parking lights on, and also allowing current to flow through said third diode to said tail lights to turn said tail lights on;

When said turn signal switch is activated at night, the current flow is the same as during the daytime but there is no effect on said parking lights and said tail lights because said parking lights and said tail lights are already on;

When said brake switch is activated in the daytime, said parking light switch being off, current flows from said battery to said second normally open contact of said parking light switch and closes said contact, allowing current to flow to said tail lights to turn said tail lights on;

When said brake switch is activated at night, said parking light switch being on, said normally closed contact of said parking light switch opens, thus interrupting the flow of current from said battery to said tail lights to turn said tail lights off.

\* \* \* \* \*